United States Patent
Wurtenberger et al.

(10) Patent No.: US 9,526,109 B1
(45) Date of Patent: Dec. 20, 2016

(54) LIMITING INTERMODULATION DISTORTION ACROSS FREQUENCY BANDS

(71) Applicant: Sprint Communications Company L.P., Overland Park, KS (US)

(72) Inventors: Andrew Mark Wurtenberger, Olathe, KS (US); Sreekar Marupaduga, Overland Park, KS (US); Patrick J. Schmidt, Bonner Springs, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/872,754

(22) Filed: Oct. 1, 2015

(51) Int. Cl.
  *H04W 72/12* (2009.01)
  *H04B 1/10* (2006.01)
  *H04L 1/20* (2006.01)

(52) U.S. Cl.
  CPC ........... *H04W 72/12* (2013.01); *H04B 1/1027* (2013.01); *H04L 1/20* (2013.01)

(58) Field of Classification Search
  CPC ............................. H04W 72/12; H04B 1/1027
  USPC ....................................................... 455/450
  See application file for complete search history.

(56) References Cited

U.S. PATENT DOCUMENTS

| | | | |
|---|---|---|---|
| 5,444,762 A | 8/1995 | Frey et al. | |
| 7,062,268 B2 | 6/2006 | McKenna | |
| 8,000,660 B1 * | 8/2011 | Woleben | H04B 1/0475 455/114.2 |
| 2007/0105519 A1 * | 5/2007 | Perkins | H03D 3/008 455/295 |
| 2013/0225095 A1 * | 8/2013 | Hong | H04B 15/00 455/73 |
| 2013/0322395 A1 * | 12/2013 | Kazmi | H04W 72/082 370/329 |
| 2015/0049841 A1 * | 2/2015 | Laporte | H03F 1/3247 375/297 |
| 2015/0091643 A1 * | 4/2015 | Kularatna | H03F 1/3247 330/149 |
| 2015/0222371 A1 * | 8/2015 | Afkhami | H04B 17/16 455/67.13 |

* cited by examiner

*Primary Examiner* — Christopher M Brandt

(57) ABSTRACT

Systems, methods, and software described herein provide enhancements for monitoring communication data for multiple applications on a wireless device. In particular, a wireless access node is configured to monitor signal to noise data for a first frequency band from a second frequency band. When the signal to noise data meets noise criteria, the access point schedules observation periods in the first frequency band to determine intermodulation distortion for the first frequency band from the second frequency band. Based on the intermodulation distortion meeting distortion criteria, the access point schedules the second frequency band to transmit data only when the first frequency band is neither transmitting nor receiving data.

20 Claims, 8 Drawing Sheets

LIMITING INTERMODULATION DISTORTION ACROSS FREQUENCY BANDS

TECHNICAL BACKGROUND

Wireless communication networks typically include wireless access systems with equipment such as wireless access, control, and routing nodes that provide wireless communication services for wireless communication devices. A typical wireless communication network includes systems to provide wireless access across a geographic region, with wireless coverage areas associated with individual wireless access nodes. The wireless access systems exchange user communications between wireless communication devices, service providers, and other end user devices. These user communications typically include voice calls, data exchanges, web pages, streaming media, or text messages, among other communication services.

In some examples, wireless access nodes may include radio frequency (RF) circuitry and processing systems capable of transmitting and receiving data from wireless communication devices over multiple frequency bands. The use of multiple frequency bands, which are allocated to individual wireless service providers, permit the wireless service providers to communicate information to the wireless communication devices over a greater overall frequency band. However, because the frequencies often span over different ranges within the wireless spectrum, noise and interference may occur between the frequencies of the wireless service provider. This interference may be even more burdensome when damage or flaws appear in the RF circuitry, making it difficult for the signal processing systems to filter out intermodulation noise from other frequencies on the wireless access node.

OVERVIEW

The technology disclosed herein enhances the ability of a wireless access node to limit intermodulation distortion between frequency bands. In one implementation, a method of operating a wireless access node includes exchanging first communication signals with wireless communication devices in a first frequency band and a second frequency band, wherein the second frequency band transmits first data when the first frequency band transmits and receives second data. The method further provides, while exchanging the first communication signals, detecting signal to noise data for the first frequency band, and determining whether the signal to noise data meets noise criteria for the first frequency band. The method also includes, if the signal to noise data meets the noise criteria, scheduling one or more observation periods for the first frequency band. The method further provides, during the one or more observation periods, determining intermodulation characteristics over the first frequency band from a second frequency band, and determining whether the intermodulation characteristics over the first frequency band meet intermodulation criteria. The method also includes, if the intermodulation characteristics meet the intermodulation criteria, scheduling second communication signals for the first frequency band and the second frequency band, wherein the second frequency band transmits third data when the first frequency band is neither transmitting nor receiving data.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
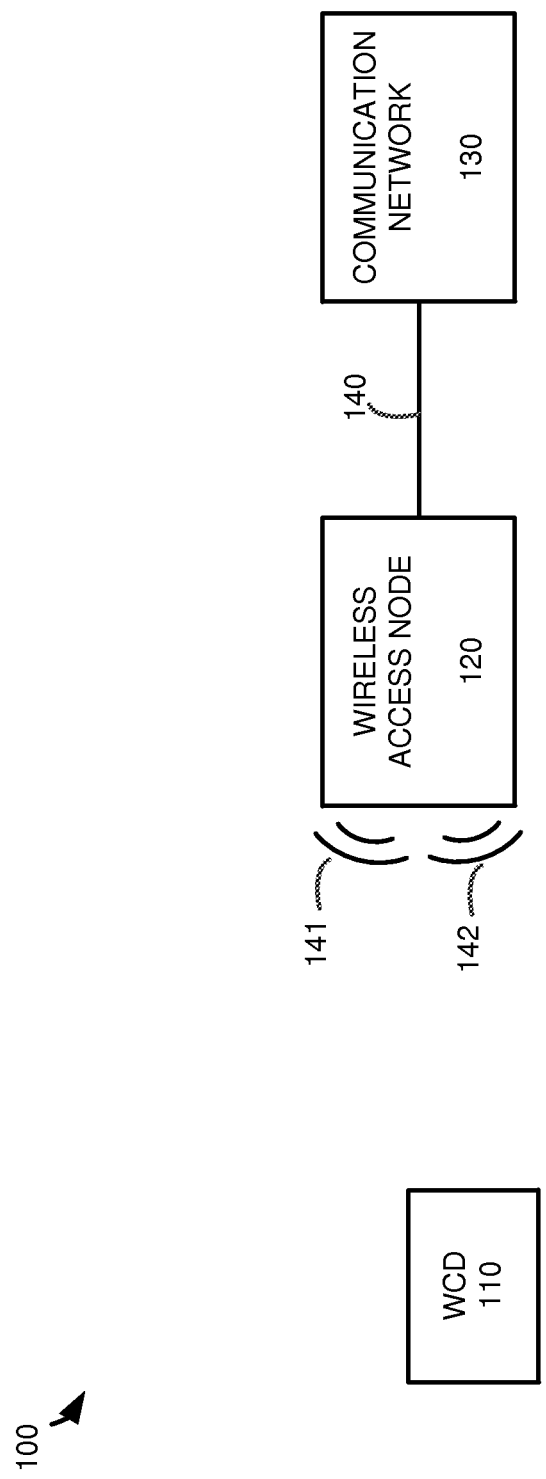
FIG. 1 illustrates a communication system to limit intermodulation distortion between frequency bands.

FIG. 1 illustrates a communication system 100 to limit intermodulation distortion between frequency bands. Communication system 100 includes wireless communication device (WCD) 110, wireless access node 120, and communication network 130. Wireless access node 120 provides wireless frequency bands 141 and 142 to wireless devices, such as WCD 110. Frequency bands 141-142 may each comprise any frequency band or range of frequencies allocated to a wireless service provider. Wireless access node further communicates with communication network 130 via communication link 140.

In operation, wireless access node 120 schedules resource blocks and resource elements for wireless devices within the coverage area of wireless access node 120. These resource blocks and elements include a frequency element and a time element that are used to separate the packet communications for each of the devices communicating with wireless access node 120. As illustrated in the present example, some wireless access nodes include the ability to communicate using multiple frequency bands, increasing the amount of bandwidth that can be used to provide the necessary communications. However, in some examples, signals for one of the frequency bands may cause intermodulation distortion in another frequency band on the same wireless access node. This intermodulation distortion may be caused by issues in the antenna for a frequency band, issues in the signal generation hardware for the particular band, or by any other hardware or software issue that might disturb the signal in the first frequency band causing undesirable intermodulation in the second frequency band.

Figure 2:
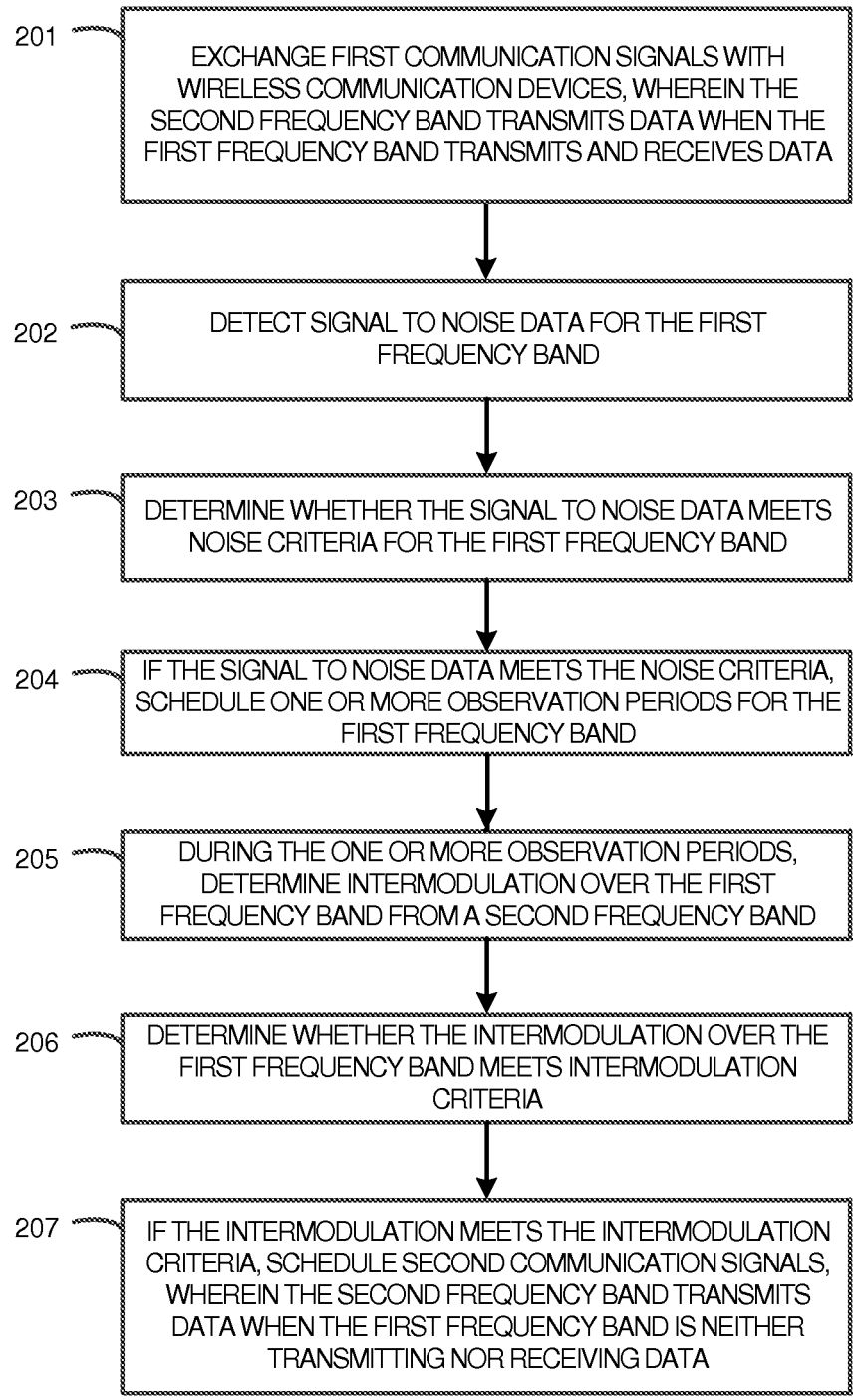
FIG. 2 illustrates a method of operating a wireless access node to limit intermodulation distortion between frequency bands.

Referring now to FIG. 2, FIG. 2 illustrates a method of operating a wireless access node to limit intermodulation distortion between frequency bands. The operations of FIG. 2 are referenced parenthetically in the description below with use of the elements from communication system 100.

As described in FIG. 1, a wireless access node may include antennas and other signal processing equipment to transmit and receive data packets in multiple frequency bands. However, due to physical or software issues with the signaling circuitry, intermodulation distortion may occur in one of the frequency bands from another frequency band on the same node. This intermodulation occurs when a second frequency band's transmission interferes with the transmission and receipt of data on a first frequency band.

To limit the effect of any intermodulation from other frequency bands, the method of FIG. 2 includes exchanging first communication signals with wireless communication devices, wherein the second frequency band transmits data when the first frequency band transmits and receives data (201). The method further includes detecting signal to noise data for the first frequency band (202), and determining whether the signal to noise data meets noise criteria for the first frequency band (203). Using the example in FIG. 1, frequency band 141 may transmit and receive signals at the same time as frequency band 142, wherein frequency band 141 is identified as possibly receiving intermodulation distortion from frequency band 142. While communicating the signals in frequency band 141 and frequency band 142, wireless access node 120 may monitor signal to noise data for frequency band 141 to determine if possible intermodulation is occurring from frequency band 142. In some implementations, the signal to noise data may be measured using a signal to interference plus noise ratio (SNIR), however, it should be understood that other signal to noise measurements may exist and are in the scope of the present disclosure. Once the values are determined for the signal to noise data, wireless access node 120 may determine whether the signal to noise data meets defined noise criteria for the frequency band 141. In some implementations, this criteria determination may include determining if the SNIR or other signal to noise value for frequency band 141 meets or exceeds a predefined SNIR or other signal to noise value for frequency band 141.

If the signal to noise data meets the noise criteria, the wireless access node schedules one or more observation periods for the first frequency band (204), which in the previous example comprises frequency band 141. To schedule the observation periods, wireless access node 120 schedules one or more resource elements to monitor the noise generated from frequency band 142. Accordingly, rather than transmitting and receiving data during the observation periods, wireless access node 120 may instead monitor the signals generated by frequency band 142. Once the observation periods are scheduled, the method further includes determining intermodulation over the first frequency band from the second frequency band during the observation periods (205). For example, the wireless access node may identify frequencies containing second or third order intermodulation interference and quantify the amount of interference at those frequencies. Once the intermodulation is determined, the wireless access node determines whether the intermodulation for the first frequency band meets intermodulation criteria (206) and if it meets the criteria, the method includes scheduling second communication signals, wherein the second frequency band transmits data when the first frequency band is neither transmitting nor receiving data (207).

Referring again to the example of FIG. 1, wireless access node 120 may observe signal transmitted by frequency band 142 in frequency band 141, and determine intermodulation characteristics of the observed signals. If the intermodulation distortion received by wireless access node 120 in frequency band 141 meets a particular criteria or amount of intermodulation distortion, wireless access node 120 modifies the scheduling routine for frequency bands 141 and 142. In particular, because frequency band 142 may be causing interference on the transfer and receipt of communications on frequency band 141, frequency band 142 is prohibited from transmitting signals while frequency band 141 is transmitting or receiving data. Accordingly, while frequency band 141 is active, frequency band 142 will be unable to cause interference in the data communications.

In some implementations, once the scheduling routine is transitioned for wireless access node 120, wireless access node 120 is further configured to monitor for supplemental signal to noise information for frequency band 141. This supplemental signal to noise information may be used by wireless access node 120 to determine whether intermodulation distortion from frequency band 142 is responsible for the distortion in frequency band 141. For example, if the signal to noise information indicated that noise was greatly reduced by modifying the scheduling of frequency bands 141-142, it would demonstrate that intermodulation was the cause of the noise issues. In contrast, if the supplemental signal to noise information did not indicate a large change in the noise for frequency band 141, this would indicate that intermodulation from frequency band 142 was likely not responsible for generating the noise. Accordingly, rather than continuing the prevention of frequency band 142 from transmitting while frequency band 141 is transmitting and receiving, wireless access node 120 may revert the scheduling process to scheduling the exchange of signals in first frequency band 141 and frequency band 142 during the same time periods.

Figure 3:
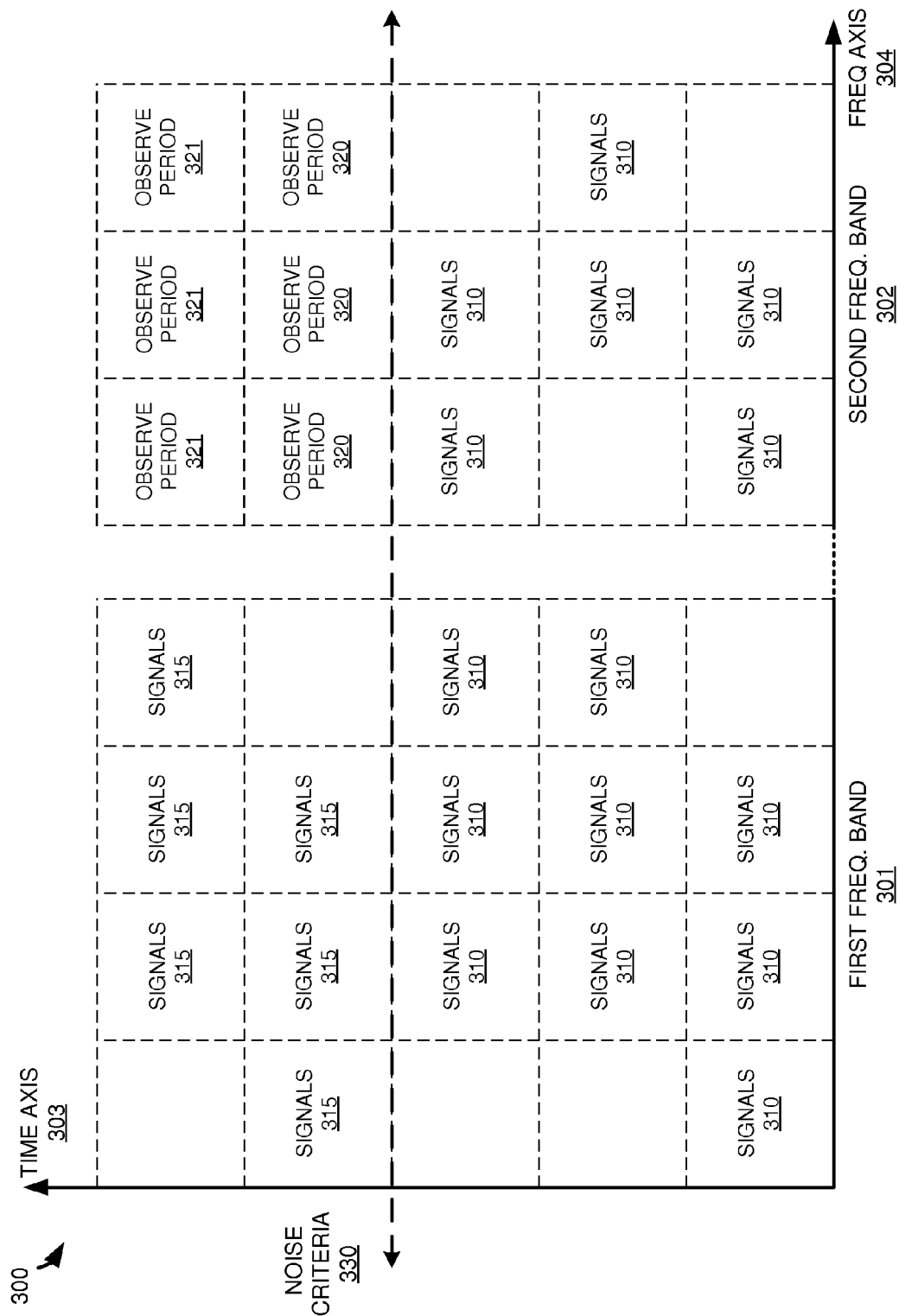
FIG. 3 illustrates a diagram of identifying signal to noise data for multiple frequency bands according to one implementation.
Figure 4:
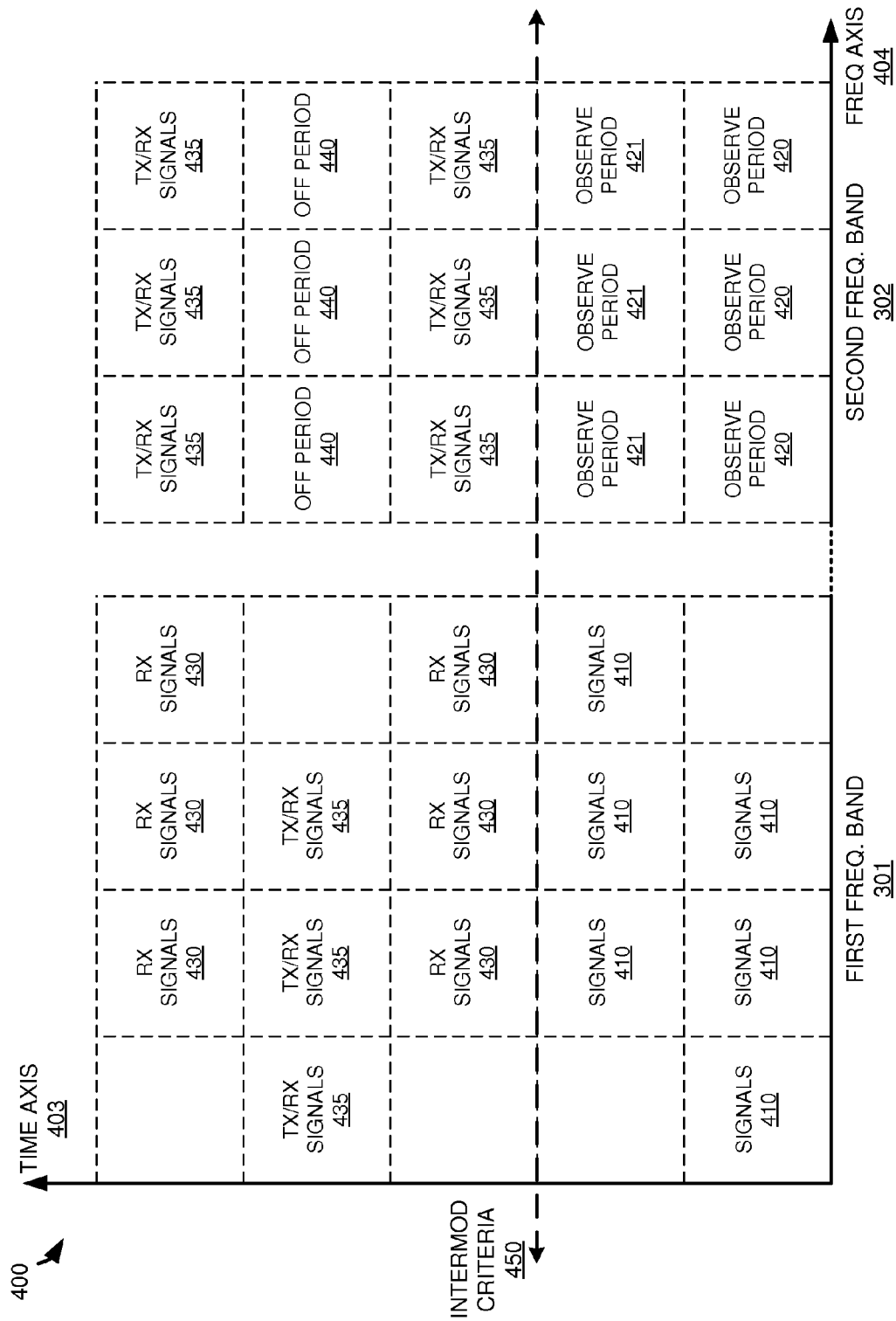
FIG. 4 illustrates a diagram of identifying signal intermodulation for multiple frequency bands according to one implementation.
Figure 5:
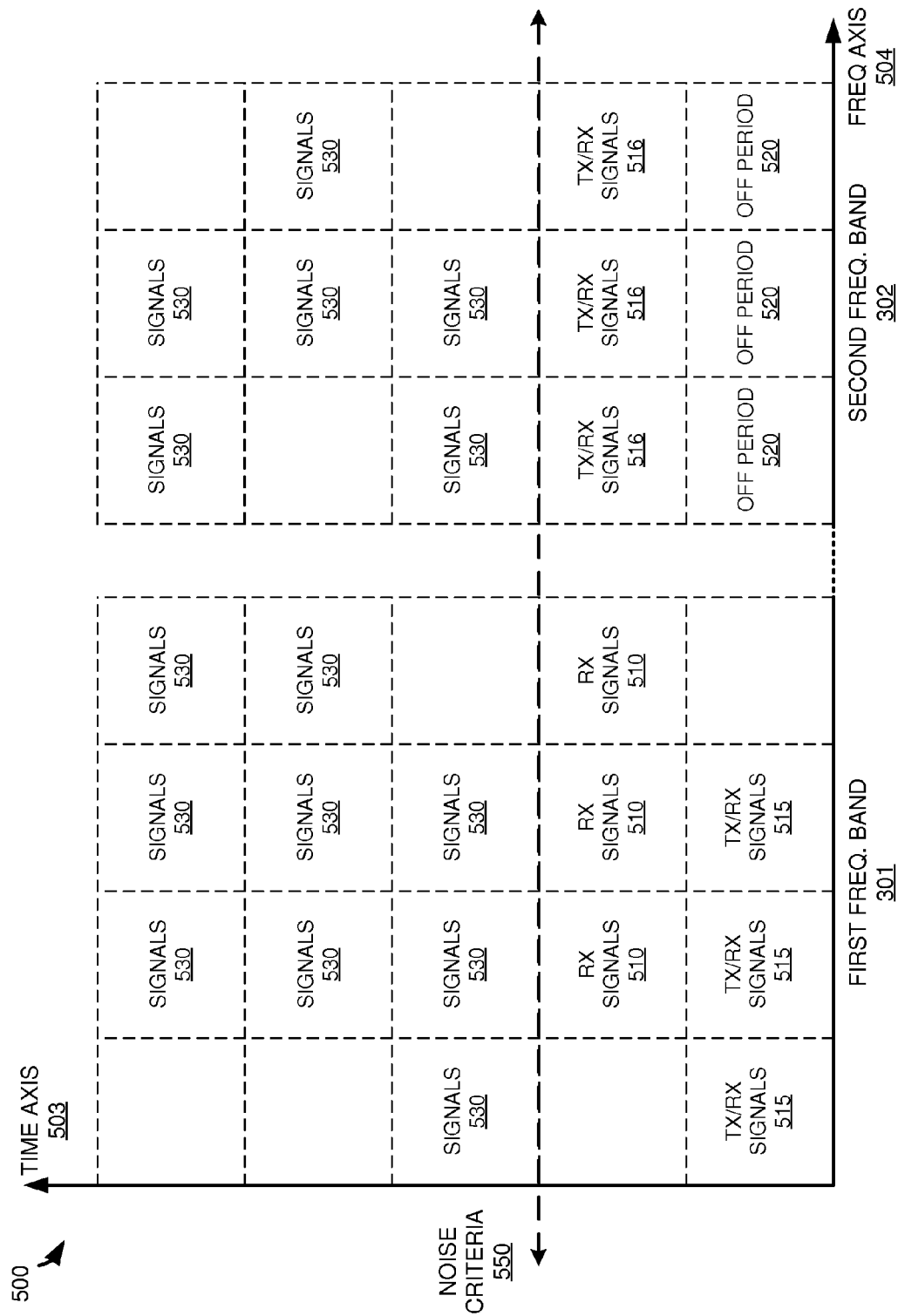
FIG. 5 illustrates a diagram of identifying signal to noise data for multiple frequency bands according to one implementation.

Turning to FIGS. 3-5, FIGS. 3-5 demonstrate scheduling transitions for a wireless access node to limit intermodulation distortion across multiple frequencies. In particular, FIG. 3 illustrates a diagram 300 of identifying signal to noise data for multiple frequency bands on a wireless access node according to one implementation. Diagram 300 includes time axis 303 and frequency (freq) axis 304. Frequency axis 304 further includes first frequency band 301 and second frequency band 302. Diagram 300 is divided into a plurality of resource blocks or resource elements that are used to allocate portions of the frequency domain to particular devices over periods of time. Second frequency band 302 comprises a frequency band that may be affected by orders of intermodulation from frequency band 301.

As described herein, a wireless access node includes radio frequency (RF) circuitry and software capable of providing wireless signaling in multiple frequency bands 301-302. To schedule to the frequency bands resource elements or resource blocks, which each comprise a segment of the available frequency band and a segment of time, are allocated to wireless devices, permitting the devices to communicate over the wireless network. As illustrated in the present example, signals 310 are exchanged between the wireless communication devices and the wireless access node, wherein signals 310 may comprise transmission signals transmitting data to the wireless communication devices, and receiving signals receiving data from the wireless communication devices.

During the communication of signals 310, the wireless access node is configured to monitor for signal to noise information identified within second frequency band 302. This signal to noise information, which may include SNIR or any other similar noise measurement, may then be compared to criteria to determine if the noise information attains noise criteria 330. If the signal to noise information fails to meet the noise criteria, then the wireless access node may continue to monitor the signals to determine if the noise ever meets the noise criteria. In contrast, as illustrated in FIG. 3, if it is determined that the signal to noise information meets noise criteria 330, the wireless access node schedules observation periods to determine intermodulation interference caused by the other frequency band 301.

Here, observer periods 320-321 are allocated within the resource elements of second frequency band 302, while first frequency band continues transmitting and receiving signals 315. By preventing the transmission of data from second frequency band 302, the wireless access node may monitor the amount of noise that is generated from the transmission of signals from first frequency band 301. This noise measurement during observe periods 320-321, may then be applied by the wireless access node to determine if any measured noise would correspond to intermodulation orders from first frequency band 301.

To further demonstrate the use of the observation periods, FIG. 4 is provided. FIG. 4 illustrates a diagram 400 of identifying signal intermodulation for multiple frequency bands according to one implementation. Diagram 400 is a continuation of Diagram 300 from FIG. 3, and includes first frequency band 301 and second frequency band 302 for a wireless access node. Diagram 400 also includes time axis 403 and frequency axis 404, which are divided into resource elements that can be allocated to connecting wireless communication devices.

As a continuation of FIG. 3, second frequency band 302 is allocated observe periods 420-421, which are used to monitor RF noise, and determine if the RF noise contains possible orders of intermodulation from first frequency band 301 and signals 410. These orders of intermodulation may comprise second orders of intermodulation, third orders of intermodulation, or any other order of intermodulation that has an affect on second frequency band 302. In some implementations, it may be determined the transmission of data in signals 410 does not meet intermodulation criteria 450 for second frequency band 302. Accordingly, the wireless access node may continue to schedule transmitting and receiving signals for frequency bands 301-302 over the same time periods, or attempt to determine different issues with the transmission of the data packets.

In other implementations, using observe periods 420-421, the wireless access node may determine that intermodulation criteria 450 is met. For example, the wireless access node may quantify the noise at one or more intermodulation frequencies in frequency band 402 and compare the noise to intermodulation criteria. After meeting intermodulation criteria 450, the wireless access node modifies the transmission of data packets for first frequency band 301 and second frequency band 302. In the particular example, the wireless access node prevents first frequency band 301 from transmitting while second frequency band is either transmitting or receiving data. As illustrated in diagram 400, during a first time period after intermodulation criteria 450, first frequency band 301 includes receive (RX) signals 430, while second frequency band 302 includes transmit/receive (TX/RX) signals 435. However, during a second time period after intermodulation criteria 450, first frequency band 301 includes TX/RX signals 430, while second frequency band 302 contains off period 440. This off period prevents intermodulation distortion affecting the communication signals in second frequency band 302.

Although illustrated in the present example with a time period for first frequency band 301 to transmit signals after intermodulation criteria 450, it should be understood that in some implementations the scheduling algorithm might prevent future transmission of signals from first frequency band 301 following the identification of intermodulation criteria 450. For example, once intermodulation criteria 450 is identified for second frequency band 302, first frequency band 301 may be limited to receiving signals from the wireless communication devices, while the second frequency band 302 handles the transmission of data to the wireless communication devices. With this configuration, second frequency band 302 will not be required to implement off periods, such as off period 440, when first frequency band 301 is transmitting data.

FIG. 5 illustrates a diagram 500 of identifying signal to noise data for multiple frequency bands according to one implementation. Diagram 500 is a continuation of Diagram 300 from FIG. 3 and Diagram 400 from FIG. 4, and includes first frequency band 301 and second frequency band 302 for a wireless access node. Diagram 500 further includes time axis 503 and frequency axis 504, which are divided into resource elements that can be allocated to connecting wireless communication devices.

As described in FIGS. 3 and 4, a wireless access node may identify signal to noise information for second frequency band 302, and schedule observation periods when the signal to noise information meets noise criteria. During the observation periods, the wireless access node identifies intermodulation characteristics in second frequency band 302 that may have been generated from signaling in first frequency band 301. Once the intermodulation characteristics meet intermodulation criteria, which may comprise a quantity of intermodulation at particular frequencies in second frequency band 302, the wireless access node prevents first frequency band 301 from transmitting data when second frequency band 302 is transmitting or receiving signals.

Here, first frequency band 301 provides TX/RX signals 515 during off period 520 for second frequency band 302. Further, when second frequency band 302 includes TX/RX signals, first frequency band 301 is limited to RX signal 510, which limits the amount of noise exposure to second frequency band 302 from first frequency band 301. During the transmission of the signals in the modified scheduling process, the wireless access node is configured to monitor for supplemental signal to noise information in second frequency band 302. This supplemental signal to noise information may be used in determining whether the change to the scheduling process has any effect on the noise identified in second frequency band 302. For example, if intermodulation were a cause of the noise in second frequency band 302, the supplemental signal to noise information may indicate a decrease in the amount of noise after transitioning to the scheduling process that prevents the first frequency band from transmitting while the second frequency is active. Accordingly, the modified scheduling process may be continued to maintain the reduction in noise.

In contrast, as is illustrated in the example of FIG. 5, if the supplemental signal to noise data meets noise criteria 550, the wireless access node may identify that intermodulation from first frequency band 301 is not responsible for the noise issues in second frequency band 302. In some implementations, noise criteria 550 may be based on the signal to noise data that was collected prior to implementing the observation periods. For example, the supplemental signal to noise data may indicate the same level of noise within second frequency band 302 as was identified when signals were being transmitted and received at the same time by frequency bands 301-302. Once signal to noise data meets noise criteria 550, the wireless access node may revert the scheduling algorithm for frequency bands 301-302 to a configuration that permits signals for first frequency band 301 to be transmitted while second frequency band 302 is active.

Figure 6:
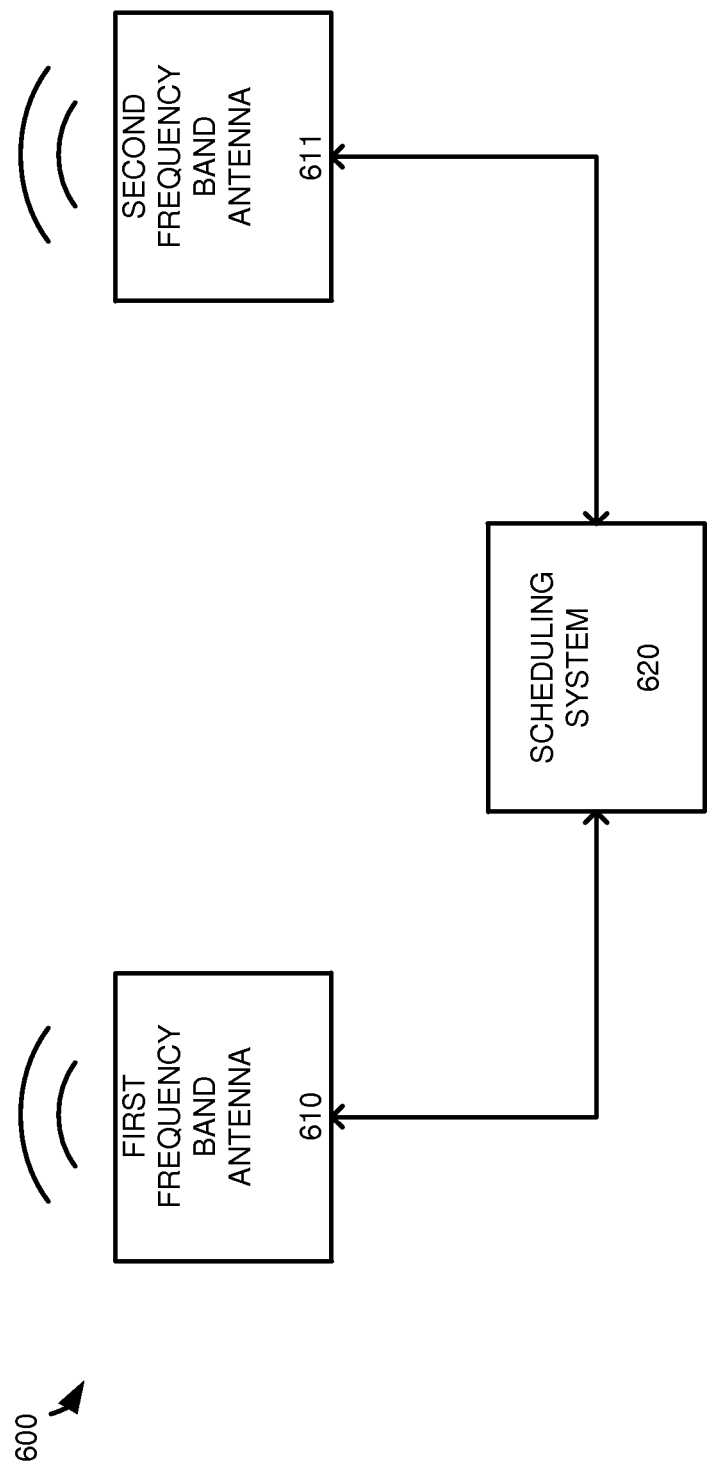
FIG. 6 illustrates a wireless access node with multiple frequency bands.

FIG. 6 illustrates a wireless access node 600 with multiple frequency bands. Wireless access node 600 is an example of an eNodeB, a Femtocell, or some other wireless access node capable of providing LTE signaling to wireless communication devices. Wireless access node 600 includes first frequency band antenna 610, second frequency band antenna 611, and scheduling system 620. First frequency band antenna 610 provides a first frequency band to wireless communication devices, and second frequency band antenna 611 provides a second frequency band to wireless communication devices. Scheduling system 620 schedules resource blocks and elements for the first and second frequency bands, wherein the first frequency band may cause intermodulation distortion in one or more frequencies of the second frequency band. Scheduling system 620 may comprise storage systems, processing systems, and any other computer related system capable of providing the scheduling operations described herein.

Figure 7:
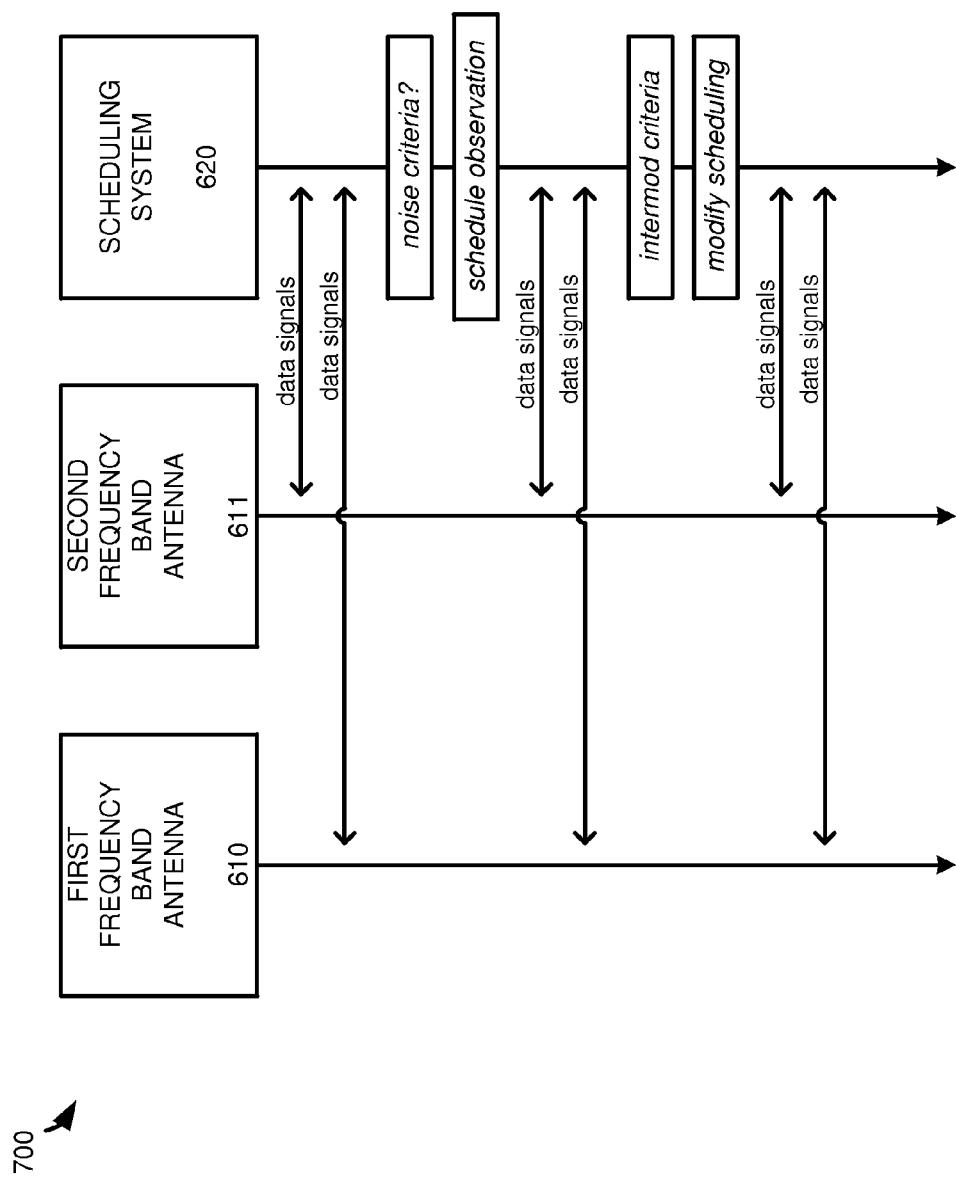
FIG. 7 illustrates a timing diagram of limiting intermodulation distortion between frequency bands in a wireless access node.

FIG. 7 illustrates a timing diagram 700 of limiting intermodulation distortion between frequency bands in a wireless access node. Timing diagram 700 includes first frequency band antenna 610, second frequency band antenna 611, and scheduling system 620 from wireless access node 600 in FIG. 6.

As illustrated in timing diagram 700, scheduling system 620 schedules first data packets for first frequency band antenna 610 and second frequency band antenna 611, permitting the data packets to be transmitted and received by each antenna over the same time period. Accordingly, first frequency band antenna 610 may transmit data while second frequency band antenna 611 transmits and receives data. While the first signals are communicated, scheduling system 610 monitors signal to noise data for the second frequency band to determine whether the signal to noise information meets noise criteria. In some implementations, the signal to noise information may comprise SNIR or other similar decibel measurements within the second frequency band. Once the measurements attain a particular noise value or criteria, scheduling system 620 may schedule observation periods for the second frequency band. These observation periods prevent the second frequency band from transmitting or receiving data for particular periods and instead identify the amount of noise and distortion that is being received by the second frequency band. Once the observation periods are scheduled, first and second frequency band antennas 611-612 exchange data signals while scheduling system 620 monitors intermodulation characteristics in the second frequency band during the observation periods.

While monitoring the intermodulation characteristics, scheduling system 620 compares the characteristics to intermodulation criteria to determine whether intermodulation might be having an effect on the communication signals of the second frequency band. In some implementations, scheduling system 620 may identify possible intermodulation orders from the first frequency band within the second frequency band. Once the frequencies at the intermodulation orders attain a particular value, scheduling system 620 may determine that the intermodulation criteria is met.

In response to identifying the intermodulation criteria, scheduling system 620 modifies the scheduling for the first and second criteria to limit the possible effects from intermodulation distortion. In some implementations, to modify the schedule, scheduling system 620 may prevent the transmission of data packets from the first frequency band while the second frequency band is transmitting or receiving. Accordingly, any intermodulation caused by the transmission of data in the first frequency band will not affect the signaling by second frequency band antenna 611. In some examples, once the intermodulation criteria is met, scheduling system 620 may prevent all future outgoing transmissions using first frequency band antenna 610, and instead use second frequency band antenna 611 for the outgoing transmissions. In other examples, scheduling system 620 may allocate transmission time periods to first frequency band antenna 610, permitting first frequency band antenna 610 to transmit data packets during off periods for second frequency antenna 611. When first frequency band 610 is not transmitting data, then second frequency band 611 may be scheduled to transmit and receive data from wireless communication devices.

Once scheduling system 620 modifies the scheduling of data for the frequency bands, first frequency band antenna 610 and second frequency band antenna 611 may exchange third data signals with wireless communication devices. In some implementations, once the scheduling is modified and the third signals are being communicated via frequency band antennas 610-611, scheduling system 620 may monitor for supplemental signal to noise data for the first and second frequency bands. This supplemental data may assist scheduling system 620 in determining whether the noise identified during the transmission of the first data packets was a result of intermodulation distortion from the first frequency band. For example, the signal to noise data identified after the scheduling modification may be compared to the signal to noise data before the scheduling modification. If the signal to noise data after the scheduling modification indicates an improvement over the signal to noise data before the scheduling modification, then it may be indicative of intermodulation distortion causing the noise. However, if the signal to noise data is similar before and after the scheduling modification, then scheduling system 620 may identify that the noise is not a result of intermodulation distortion, and revert the scheduling algorithm to the pre-modification algorithm. This reverting of the scheduling algorithm may include permitting transmission and reception of signals for the first frequency band and second frequency band during the same time periods, or in resource blocks/elements during the same time period.

Figure 8:
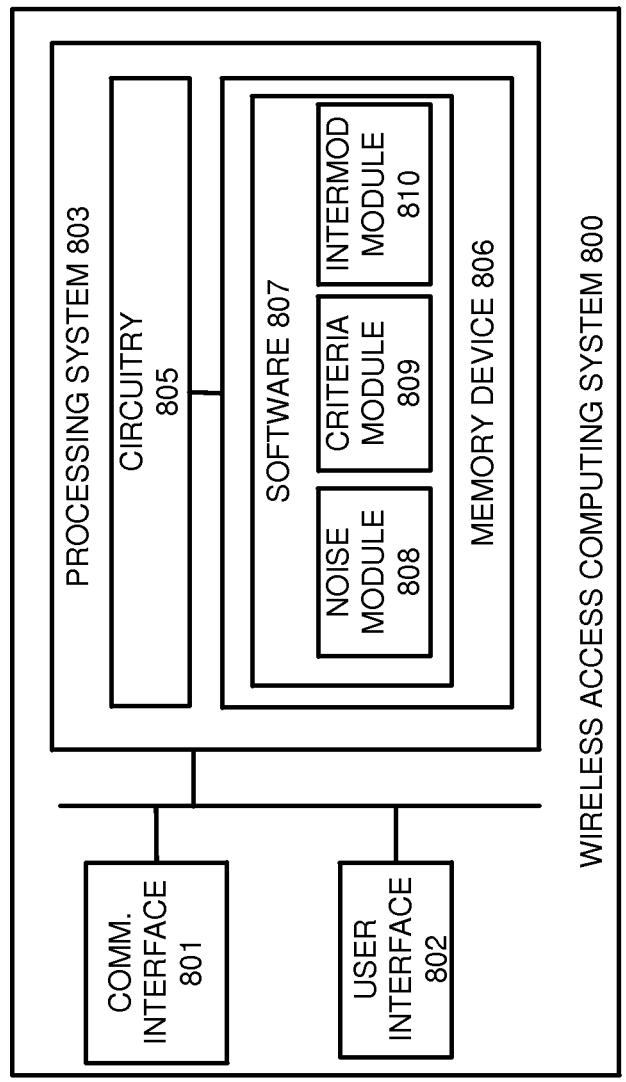
FIG. 8 illustrates a wireless access computing system to limit intermodulation distortion between frequency bands.

FIG. 8 illustrates a wireless access computing system 800 to limit intermodulation distortion between frequency bands. Wireless access computing system 800 is representative of any computing system or systems with which the various operational architectures, processes, scenarios, and sequences disclosed herein for a wireless access node may be implemented. Wireless access computing system 800 is an example of wireless access node 120 and 600, although other examples may exist. Wireless access computing system 800 comprises communication interface 801, user interface 802, and processing system 803. Processing system 803 is linked to communication interface 801 and user interface 802. Processing system 803 includes processing circuitry 805 and memory device 806 that stores operating software 807. Wireless access computing system 800 may include other well-known components such as a battery and enclosure that are not shown for clarity.

Communication interface 801 comprises components that communicate over communication links, such as network cards, ports, radio frequency (RF) transceivers, processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format—including combinations thereof. In particular, communication interface 801 may be configured to provide LTE signaling to wireless devices using two or more frequency bands, and may further be configured to communicate with one or more routers and gateways of a wireless communication network.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Processing circuitry 805 is typically mounted on a circuit board that may also hold memory device 806 and portions of communication interface 801 and user interface 802. Operating software 807 comprises computer programs, firmware, or some other form of machine-readable processing instructions. Operating software 807 includes noise module 808, criteria module 809, and intermodulation (intermod) module 810, although any number of software modules may provide the same operation. Operating software 807 may further include an operating system, utilities, drivers, network interfaces, applications, or some other type of software. When executed by processing circuitry 805, operating software 807 directs processing system 803 to operate wireless access computing system 800 as described herein.

In particular, noise module 808 directs processing system 803 to identify signal to noise data in a first frequency band, wherein wireless access computing system 800 provides a first frequency band and a second frequency band to wireless communication devices, and wherein the second frequency band transmits data when the first frequency band transmits and receives data. While identifying the signal to noise data in the first frequency band, criteria module 809 directs processing system 803 to determine whether the signal to noise data meets noise criteria. In some implementations, noise data may be measured in decibels, which can be compared to a predefined threshold amount of noise. Once the signal to noise data meets the criteria, intermodulation module 810 directs processing system 803 to implement observation periods within the first frequency band to monitor for intermodulation distortion characteristics from the second frequency band. In some examples, imperfections or issues within the antennas and signaling circuitry may cause the second frequency band to cause intermodulation distortion within the first frequency band. To identify the intermodulation distortion, computing system 800 may identify frequencies where which intermodulation interference may occur the second frequency band, and quantify the amount of distortion that exists at these frequencies.

As the intermodulation interference is identified, criteria module 809 directs processing system 803 to determine when the intermodulation characteristics identified in the first frequency band meet distortion criteria. If the intermodulation characteristics meet the distortion criteria, criteria module 809 directs processing system 803 to modify the scheduling algorithm for the first and second frequency bands. In particular, the modification of the scheduling may prevent the second frequency band from transmitting data while the first frequency band is transmitting and receiving data. Accordingly, while the first frequency band is communicating data, antennas associated with the second frequency band will not provide distortion or noise in the first frequency band.

In some implementations, once the intermodulation criteria is met, the second frequency band may be prevented from transmitting any data, while the first frequency band will be relied on to transmit data to the connecting devices. In other implementations, off periods may be scheduled in the first frequency band, permitting the second frequency band to transmit data in resource elements within the off period.

Once the scheduling modification is generated, preventing the second frequency band from transmitting while the first frequency band is communicating, noise module 808 may further direct processing system 803 to identify supplemental signal to noise data for the first frequency band. This supplemental signal to noise data may then be compared to criteria to determine if the changes to the scheduling had any effect on the noise in the first frequency band. For example, if the supplemental signal to noise data identified that noise was greatly reduced from the originally identified signal to noise data, computing system 800 may determine that the modified scheduling assisted in reducing the amount of noise in the signal. In contrast, if it were determined that the signal to noise were similar in both scheduling algorithms, it may be determined that the intermodulation distortion may not be the cause of the noise in the first frequency band.

Returning to the elements of FIG. 1, WCD 110 comprises Radio Frequency (RF) communication circuitry and an antenna. The RF communication circuitry typically includes an amplifier, filter, modulator, and signal processing circuitry. WCD 110 may also include a user interface, memory device, software, processing circuitry, or some other communication components. WCD 110 may comprise a telephone, computer, e-book, mobile Internet appliance, wireless network interface card, media player, game console, or some other wireless communication apparatus.

Wireless access node 120 comprises RF communication circuitry and at least one antenna to provide LTE wireless communications. The RF communication circuitry typically includes an amplifier, filter, RF modulator, and signal processing circuitry. Wireless access node 120 may also comprise a router, server, memory device, software, processing circuitry, cabling, power supply, network communication interface, structural support, or some other communication apparatus. Wireless access node 120 may comprise an eNodeB, a Femtocell, or some other device configured to provide LTE wireless communications. Wireless access node 120 includes RF communication circuitry to supply frequency bands 141-142, wherein one of the bands may cause intermodulation distortion in the other band.

Communication network 130 comprises network elements that provide communication services to WCD 110. Communication network 130 may comprise switches, wireless access nodes, Internet routers, network gateways, application servers, computer systems, communication links, or some other type of communication equipment—including combinations thereof. Communication network 130 may comprise the internet, an LTE wireless communication network, as well as other similar communication networks.

Frequency bands 141-142 include wireless links that use the air or space as transport media, and communicate with wireless devices using LTE format. Communication link 140 could use various communication protocols, such as Time Division Multiplex (TDM), Internet Protocol (IP), Ethernet, communication signaling, wireless communication signaling, or some other communication format—including combinations thereof. Communication link 140 could be a direct link or may include intermediate networks, systems, or devices.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a wireless access node to limit intermodulation distortion between frequency bands, the method comprising:
   exchanging first communication signals with wireless communication devices in a first frequency band and a second frequency band, wherein the second frequency band transmits first data when the first frequency band transmits and receives second data;
   while exchanging the first communication signals, detecting signal to noise data for the first frequency band;
   determining whether the signal to noise data meets noise criteria for the first frequency band;
   if the signal to noise data meets the noise criteria, scheduling one or more observation periods for the first frequency band;
   during the one or more observation periods, determining intermodulation characteristics over the first frequency band from a second frequency band;
   determining whether the intermodulation characteristics over the first frequency band meet intermodulation criteria; and
   if the intermodulation characteristics meet the intermodulation criteria, scheduling second communication signals for the first frequency band and the second frequency band, wherein the second frequency band transmits third data when the first frequency band is neither transmitting nor receiving data.

2. The method of claim 1 wherein the first frequency band comprises a first carrier frequency and the second frequency band comprises a second carrier frequency.

3. The method of claim 1 wherein the wireless access node comprises an eNodeB.

4. The method of claim 1 further comprising detecting supplemental signal to noise data for the first frequency band after scheduling the second communication signals for the first frequency band and the second frequency band.

5. The method of claim 4 further comprising:
   determining whether the supplemental signal to noise data meets second noise criteria for the first frequency band; and
   if the supplemental signal to noise data meets the second noise criteria, scheduling third communication signals for the first frequency band and the second frequency band, wherein the second frequency band transmits fourth data when the first frequency band transmits and receives fifth data.

6. The method of claim 1 wherein the first frequency band comprises a first Long Term Evolution (LTE) frequency band and wherein the second frequency band comprises a second LTE frequency band.

7. The method of claim 1 wherein the signal to noise data for the first frequency band comprises a signal to interference plus noise ratio (SNIR) measurement for the first frequency band.

8. The method of claim 1 wherein the intermodulation characteristics over the first frequency band from the second frequency band comprises one of second-order intermodulation distortion products or third-order intermodulation distortion products for the first frequency band from the second frequency band.

9. An apparatus to limit intermodulation distortion between frequency bands, the apparatus comprising:
   one or more non-transitory computer readable media;
   processing instructions stored on the one or more non-transitory computer readable media that, when executed by a processing system, direct the processing system to:
   exchange first communication signals with wireless communication devices in a first frequency band and a second frequency band, wherein the second frequency band transmits first data when the first frequency band transmits and receives second data;
   while exchanging the first communication signals, detect signal to noise data for the first frequency band;
   determine whether the signal to noise data meets noise criteria for the first frequency band;
   if the signal to noise data meets the noise criteria, schedule one or more observation periods for the first frequency band;
   during the one or more observation periods, determine intermodulation characteristics over the first frequency band from the second frequency band;
   determine whether the intermodulation characteristics over the first frequency band meet intermodulation criteria; and
   if the intermodulation characteristics meet the intermodulation criteria, schedule second communication signals for the first frequency band and the second frequency band, wherein the second frequency band transmits third data when the first frequency band is neither transmitting nor receiving data.

10. The apparatus of claim 9 wherein the first frequency band comprises a first carrier frequency and the second frequency band comprises a second carrier frequency.

11. The apparatus of claim 9 wherein the processing instructions further direct the processing system to detect supplemental signal to noise data for the first frequency band after scheduling the second communication signals for the first frequency band and the second frequency band.

12. The apparatus of claim 11 wherein the processing instructions further direct the processing system to:
   determine whether the supplemental signal to noise data meets second noise criteria for the first frequency band; and
   if the supplemental signal to noise data meets the second noise criteria, schedule third communication signals for the first frequency band and the second frequency band, wherein the second frequency band transmits fourth data when the first frequency band transmits and receives fifth data.

13. The apparatus of claim 9 wherein the first frequency band comprises a first Long Term Evolution (LTE) frequency band and wherein the second frequency band comprises a second LTE frequency band.

14. The apparatus of claim 9 wherein the signal to noise data for the first frequency band comprises a signal to interference plus noise ratio (SNIR) measurement for the first frequency band.

15. The apparatus of claim 9 wherein the intermodulation characteristics over the first frequency band from the second frequency band comprises one of second-order intermodulation distortion products or third-order intermodulation distortion products for the first frequency band from the second frequency band.

16. The apparatus of claim 9 wherein the processing instructions to schedule the one or more observation periods for the first frequency band direct the processing system to schedule one or more resource elements in the first frequency band to neither transmit nor receive data.

17. A wireless access node to limit intermodulation distortion between frequency bands, the wireless access node comprising:
   a first frequency band antenna for a first frequency band;
   a second frequency band antenna for a second frequency band;
   a scheduling system configured to:
      schedule an exchange of first communication signals with wireless communication devices using the first frequency band and the second frequency band, wherein the second frequency band transmits first data when the first frequency band transmits and receives second data;
      during the exchange of the first communication signals, detect signal to noise data for the first frequency band;
      determine whether the signal to noise data meets noise criteria for the first frequency band;
      if the signal to noise data meets noise criteria, schedule one or more observation periods for the first frequency band;
      during the one or more observation periods, determine intermodulation characteristics over the first frequency band from the second frequency band;
      determine whether the intermodulation characteristics over the first frequency band meet intermodulation criteria; and
      if the intermodulation characteristics meet the intermodulation criteria, schedule second communication signals for the first frequency band and the second frequency band, wherein the second frequency band transmits third data when the first frequency band is neither transmitting nor receiving data.

18. The wireless access node of claim 17 wherein the first frequency band comprises a first Long Term Evolution (LTE) frequency band and wherein the second frequency band comprises a second LTE frequency band.

19. The wireless access node of claim 17 wherein the intermodulation characteristics over the first frequency band from the second frequency band comprises one of second-order intermodulation distortion products or third-order intermodulation distortion products for the first frequency band from the second frequency band.

20. The wireless access node of claim 17 wherein the scheduling system configured to schedule the one or more observation periods for the first frequency band is configured to schedule one or more resource elements in the first frequency band to neither transmit nor receive data.

* * * * *